United States Patent
Kumar et al.

(10) Patent No.: US 11,606,760 B2
(45) Date of Patent: *Mar. 14, 2023

(54) DYNAMIC POWER ADJUSTMENT FOR SMALL CELLS

(71) Applicant: ARRIS Enterprises LLC, Suwanee, GA (US)

(72) Inventors: Utsaw Kumar, Sunnyvale, CA (US); Shailender Potharaju, Fremont, CA (US); Paul Petrus, San Jose, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 78 days.

This patent is subject to a terminal disclaimer.

(21) Appl. No.: 17/199,570

(22) Filed: Mar. 12, 2021

(65) Prior Publication Data

US 2021/0204224 A1 Jul. 1, 2021

Related U.S. Application Data

(63) Continuation of application No. 16/900,272, filed on Jun. 12, 2020, now Pat. No. 10,966,160, which is a
(Continued)

(51) Int. Cl.
*H04W 52/24* (2009.01)
*H04W 24/10* (2009.01)
(Continued)

(52) U.S. Cl.
CPC ........ *H04W 52/244* (2013.01); *H04B 17/318* (2015.01); *H04W 24/10* (2013.01);
(Continued)

(58) Field of Classification Search
None
See application file for complete search history.

(56) References Cited

U.S. PATENT DOCUMENTS

| 4,718,081 A * | 1/1988 | Brenig | H04W 36/30 455/438 |
| 8,487,516 B2 * | 7/2013 | Brisebois | H04W 16/32 310/370 |

(Continued)

FOREIGN PATENT DOCUMENTS

CN 105307192 A * 2/2016

OTHER PUBLICATIONS

Extended European Search Report, European Patent Application No. 18203817.4, dated Mar. 19, 2019.
(Continued)

*Primary Examiner* — Mohammed Rachedine
(74) *Attorney, Agent, or Firm* — Stewart M. Wiener; Steven Stupp (57) ABSTRACT

A radio node may transmit a signal using a transmit power. Then, the radio node may adjust the transmit power within a range of values. The adjustment may include reducing the transmit power when a spatial received signal strength indication (RSSI) metric of the radio node is greater than a first threshold value and a coverage criterion is met. Note that the spatial RSSI metric of the radio node may correspond to a set of temporal RSSI metrics of the radio node received from neighboring radio nodes. Moreover, the coverage criterion may be that less than a portion of RSSI measurements of the radio node associated with electronic devices, which are communicatively attached with the radio node, is less than a second threshold value. Alternatively, the adjustment may include increasing the transmit power when the spatial RSSI metric is less than the first threshold value.

20 Claims, 4 Drawing Sheets

Related U.S. Application Data continuation of application No. 16/175,981, filed on Oct. 31, 2018, now Pat. No. 10,716,071.

(60) Provisional application No. 62/579,360, filed on Oct. 31, 2017.

(51) Int. Cl.
    *H04W 52/14*     (2009.01)
    *H04W 52/36*     (2009.01)
    *H04W 52/38*     (2009.01)
    *H04W 84/04*     (2009.01)
    *H04B 17/318*     (2015.01)
    *H04W 92/20*     (2009.01)

(52) U.S. Cl.
CPC ....... *H04W 52/143* (2013.01); *H04W 52/245* (2013.01); *H04W 52/247* (2013.01); *H04W 52/367* (2013.01); *H04W 52/362* (2013.01); *H04W 52/386* (2013.01); *H04W 84/045* (2013.01); *H04W 92/20* (2013.01)

(56) References Cited

U.S. PATENT DOCUMENTS

| | | | |
|---|---|---|---|
| 10,313,913 B2* | 6/2019 | Ji | H04W 72/1284 |
| 2009/0232038 A1* | 9/2009 | Gonzalez-Velazquez | H04B 7/2656 370/476 |
| 2013/0040635 A1* | 2/2013 | Hong | H04W 52/244 455/422.1 |
| 2014/0098752 A1 | 4/2014 | Venkata et al. | |
| 2016/0040635 A1 | 2/2016 | Hong | |
| 2016/0095067 A1* | 3/2016 | Jurzak | H04B 17/24 370/311 |
| 2017/0238329 A1* | 8/2017 | Singh | H04B 7/0413 455/452.1 |
| 2018/0242160 A1 | 8/2018 | Morita et al. | |

OTHER PUBLICATIONS

European Search Report, European Patent Application No. 20175525.3, dated Sep. 29, 2020.

* cited by examiner

DYNAMIC POWER ADJUSTMENT FOR SMALL CELLS

CROSS REFERENCE TO RELATED APPLICATIONS

This application is a continuation of U.S. patent application Ser. No. 16/900,272, "Dynamic Power Adjustment for Small Cells," by Utsaw Kumar, Shailender Potharaju and Paul Petrus, filed on Jun. 12, 2020, which is a continuation of U.S. patent application Ser. No. 16/175,981, "Dynamic Power Adjustment for Small Cells," by Utsaw Kumar, Shailender Potharaju and Paul Petrus, filed on Oct. 31, 2018 (now U.S. Pat. No. 10,716,071, issued on Jul. 14, 2020), and claims priority under 35 U.S.C. 119(e) to U.S. Provisional Application Ser. No. 62/579,360, entitled "Dynamic Power Adjustment for Small Cells," by Utsaw Kumar, Shailender Potharaju and Paul Petrus, filed on Oct. 31, 2017, the contents of each of which are herein incorporated by reference.

BACKGROUND

Field

The described embodiments relate to techniques for dynamically adjusting transmit power in a small-cell network.

Related Art

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth™ from the Bluetooth Special Interest Group of Kirkland, Wash.), and/or another type of wireless network.

A cellular-telephone network may include base stations (and associated cell towers) that implement so-called 'macro cells.' These macro cells may facilitate communication with hundreds of users (such as hundreds of cellular telephones) over distances of kilometers. In general, the positioning of the cell towers (and the antennas) is carefully designed and optimized by a mobile network operator to maximize the performance of the cellular-telephone network (such as the throughput, the capacity, the block error rate, etc.) and to reduce cross-talk or interference between the signals transmitted by different cell towers and/or different macro cells.

Because there are often gaps in the coverage offered by macro cells (such as gaps in radio coverage that can occur in the interior of a building when the transmission in a macro cell is not be powerful enough to penetrate the building), some users operate local transceivers that provide short-range communication in the cellular-telephone network, such as over a range of 100 m. In principle, such a small-scale network complements the service offered by the mobile network operator and can offer improved communication performance, such as in a particular venue or environment. This intermediate-range coverage in the cellular-telephone network is typically referred to as a 'small cell.'

Dense small cell deployments are being considered as a solution to deal with the demands for ubiquitous connectivity and increased data rates in cellular-telephone networks. However, it can be difficult to manage the transmit power in small cell to address inter-cell interference and to maintain the communication performance.

SUMMARY

A described embodiment relates to a radio node that dynamically adjusts a transmit power. This radio node includes an antenna and an interface circuit that wirelessly communicates with neighboring radio nodes. During operation, the radio node may transmit, via the interface circuit, a signal using the transmit power. Then, the radio node may adjust the transmit power within a range of values. The adjustment may include reducing the transmit power when a spatial received signal strength indication (RSSI) metric of the radio node is greater than a first threshold value and a coverage criterion is met. Note that the spatial RSSI metric of the radio node may correspond to a set of temporal RSSI metrics of the radio node received from the neighboring radio nodes, where the set of temporal RSSI metrics may correspond to RSSI measurements of the radio node at the neighboring radio nodes. Moreover, the coverage criterion may be that less than a portion of RSSI measurements of the radio node associated with electronic devices, which are communicatively attached with the radio node, is less than a second threshold value. Alternatively, the adjustment may include increasing the transmit power when the spatial RSSI metric is less than the first threshold value.

In some embodiments, the radio node may: measure, at the interface circuit, RSSIs of the neighboring radio nodes; compute temporal RSSI metrics based at least in part on the RSSI measurements of the neighboring radio nodes; exchange, via the interface circuit, information specifying the set of temporal RSSI metrics with the neighboring radio nodes, where the set of temporal RSSI metrics include the computed temporal RSSI metrics; calculate the spatial RSSI metric representing the environment of the radio node based at least in part on the set of temporal RSSI metrics of the radio node received from the neighboring radio nodes, where a given temporal RSSI metric of the radio node in the set of temporal RSSI metrics used to compute the spatial RSSI metric is associated with a given neighboring radio node; and receive, at the interface circuit, the RSSI measurements of the radio node associated with the electronic devices that are communicatively attached with the radio node.

Note that the interface circuit may measure the RSSIs using a network listen mode.

Moreover, computing the temporal RSSI metrics may involve at least one of: a median, an infinite impulse response filter, or a weighted mean. Furthermore, calculating the spatial RSSI metric may involve a weighted mean.

Additionally, the measuring of the RSSI of the neighboring radio nodes may be performed at same frequency as the RSSI measurements of the radio node associated with the electronic devices that are communicatively attached to the radio node.

In some embodiments, the neighboring radio nodes include at least intra-frequency neighboring radio nodes that operate at the same frequency as the radio node. Alternatively, the neighboring radio nodes may include intra-frequency neighboring radio nodes that operate at the same frequency as the radio node and inter-frequency neighboring radio nodes that operate at different frequencies as the radio node.

Moreover, the RSSIs may include reference signal receive powers (RSRPs).

Furthermore, the radio node and the neighboring radio nodes may include eNodeBs, a Universal Mobile Telecommunications System (UMTS) NodeB and/or a next generation or new radio (NR) gNodeB.

Additionally, the radio node may exchange the information specifying the set of temporal RSSI metrics using one or more X2 interface connections.

Note that the transmit power may initially be a maximum transmit power.

Another embodiment provides a radio node that communicates with a controller (such as a radio network controller). This controller may perform at least some of the aforementioned operations of the radio node.

Another embodiment provides a computer-readable storage medium for use with the radio node. This computer-readable storage medium may include program instructions that, when executed by the radio node, causes the radio node to perform at least some of the aforementioned operations.

Another embodiment provides a method for adjusting a transmit power. This method includes at least some of the operations performed by the radio node.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

A radio node may transmit a signal using a transmit power. Then, the radio node may adjust the transmit power within a range of values. The adjustment may include reducing the transmit power when a spatial received signal strength indication (RSSI) metric of the radio node is greater than a first threshold value and a coverage criterion is met. Note that the spatial RSSI metric of the radio node may correspond to a set of temporal RSSI metrics of the radio node received from neighboring radio nodes, where the set of temporal RSSI metrics may correspond to RSSI measurements of the radio node at the neighboring radio nodes. Moreover, the coverage criterion may be that less than a portion of RSSI measurements of the radio node associated with electronic devices, which are communicatively attached with the radio node, is less than a second threshold value. Alternatively, the adjustment may include increasing the transmit power when the spatial RSSI metric is less than the first threshold value.

By dynamically adjusting the transmit power, this communication technique may improve the communication performance of the radio node and the neighboring radio nodes, such as in a small-cell network. Notably, the communication technique may allow the radio node to improve or maximize the communication performance and quality without coverage holes or excessive interference. Moreover, by considering temporal context and spatial context or filtering, the communication technique may adjust the transmit power in a robust manner, so that it is not adversely impacted by erroneous measurements or faulty radio nodes. Consequently, the communication technique may improve the user experience, and thus may improve customer satisfaction and retention.

In the discussion that follows, Long Term Evolution or LTE (from the 3rd Generation Partnership Project of Sophia Antipolis, Valbonne, France) is used as an illustration of a data communication protocol in a cellular-telephone network that is used during communication between one or more radio nodes and electronic devices. Consequently, eNodeBs or eNBs are used as illustrative examples of the radio nodes. However, a wide variety of communication techniques or protocols may be readily used for the various embodiments. For example, an electronic device and a radio node may communicate frames or packets in accordance with a wireless communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), a cellular-telephone or data network (such as using a third generation or 3G communication protocol, a fourth generation or 4G communication protocol, e.g., LTE, LTE Advanced or LTE-A, a fifth generation or 5G communication protocol, or other present or future developed advanced cellular communication protocol) and/or another type of wireless interface (such as another communication protocol). Thus, the radio nodes may include: an eNodeB, a UMTS NodeB, an NR eNodeB or gNodeB, etc.

Moreover, the radio node may communicate with other radio nodes and/or computers in a network using a wired communication protocol, such as an IEEE 802.3 standard (which is sometimes referred to as 'Ethernet') and/or another type of wired interface. In the discussion that follows, Ethernet is used as an illustrative example.

Furthermore, the communication technique may be applied to one or more channels in one or more bands of frequencies. In the discussion that follows, one or more channels in a shared-license-access band of frequencies are used as an illustrative example. For example, a shared-license-access band of frequencies near 3.5 GHz (such as between 3.55 and 3.7 GHz) may be used. This shared-license-access band of frequencies is sometimes referred to as 'Citizen Broadband Radio Service' (CBRS). However, a wide variety of bands of frequencies may be used, including: a band of frequencies near or including 2.4 GHz, a band of frequencies near or including 3.6 GHz, a band of frequencies near or including 4.9 GHz, a band of frequencies near or including 5 GHz, a band of frequencies near or including 5.9 GHz, a band of frequencies near 60 GHz and/or another band of frequencies. Note that the bands of frequencies may include one or more bands of frequencies.

As discussed previously, a cellular-telephone network may include base stations (and associated cell towers) that implement so-called 'macro cells.' Moreover, some users operate local transceivers in small cells that provide short-range communication in the cellular-telephone network. In some embodiments, entities establish or host small cells based on a data communication protocol, such as LTE. However, as noted previously, a wide variety of communication techniques or protocols may be used to implement a small cell, such as those used in cellular systems or to communicate with a radio-access network and are not limited to LTE. For example, in some embodiments the described communication technique is used in conjunction with Wi-Fi. These small cells are examples of enterprise-hosted networks or EHNs (which are sometimes referred to as 'neutral-host networks), i.e., networks that are hosted by entities other than a mobile network operator (such as a cellular-telephone carrier).

In principle, small cells operated by mobile network operators and/or one or more other entities can provide improved communication performance, such as improved coverage, connectivity and/or data rates. However, it can be difficult to manage the transmit power in small cell to address inter-cell interference and to maintain the communication performance.

For example, for indoor deployments, there is often a tradeoff between sufficient indoor coverage and limited outdoor leakage in order to avoid pilot pollution and interference for outdoor macro-base-station downlink transmissions. Additionally, small cells transmitting on the same frequency can cause both pilot and data interference, which can degrade downlink performance. Ideally, these problems can be addressed by managing the transmit power of the small cells to bound inter-cell interference to boost the system capacity, while not adversely impacting coverage.

Moreover, in order to support a variety of deployments, it is also desired that the transmit power management of these small cells be automated. This automated power adjustment may be even more useful for shared spectrum technologies like the CBRS, in which small cells may change channels when, e.g., a cleaner channel with less interference is detected or when directed by spectrum access system (SAS) or a central entity that governs or controls the spectrum. Furthermore, small cells may switch channels when conditions change, such as when new small cells are added (e.g., in a dense deployment), due to changes in the transmit power of existing small cells, the availability (or unavailability) of channels for transmission, etc.

While channel changes may not occur too frequently, the small cells may need to adjust their transmit power dynamically in order to account for such changes in the environment. For example, two adjacent and overlapping small cells that, respectively, operate on two channels ($f_1$ and $f_2$), can transmit at full power without causing any inter-cell interference. However, if the SAS detects the presence of an incumbent on $f_1$ and asks one of the small cells to move to and also use $f_2$, the two small cells may have significant inter-cell interference if they keep transmitting at full transmit power. Similarly, if the channel $f_1$ becomes available again, one of the small cells can move to and use $f_1$ and both the small cells can revert to transmitting at full transmit power.

A small-cell network may rely on a self-organizing network (SON) module to make the small cells more easily deployable and scalable. A SON implementation can be either distributed or centralized. In a distributed SON implementation, the small cells may interact with neighboring small cells and may deduce their own operating settings. Alternatively, in a centralized SON implementation, a central entity (such as a controller) may interact with the small cells and it may determine the operating settings. In general, a distributed implementation may be more scalable and may not require extensive message exchange between the central entity and a large number of small cells.

However, system-wide optimization in a distributed architecture can be difficult. Notably, each small cell typically has local information or a local view of the small-cell network, and thus often only has information about its neighbors. This limited information can make it difficult for the small cells to determine how to appropriately adjust its transmit power. For example, if the small cells transmit with transmit powers that are too high, there may be too much inter-cell interference. Alternatively, if the small cells transmit with transmit powers that are too low, there may be coverage holes. Furthermore, changing the transmit power for a particular small cell may improve the communication performance in one part of the deployment, while at the same time it may worsen the communication performance in another part of the deployment. Additionally, a malfunctioning unit (such as a radio node or a transceiver in a small cell) can cause a ripple effect on the whole small-cell network.

In order to address these challenges, the communication technique may be used to perform dynamic transmit power adjustment for a small-cell network. In the communication technique, each small cell makes use of local information to determine their transmit power, such as network listen results, measurements from neighboring small cells (e.g., via X2 connection to the neighboring small cells), and/or additional measurements from electronic devices (such as cellular telephones) that are communicatively attached to the small cells. Moreover, in order to reduce or eliminate the effect of erroneous measurements and/or defective radio nodes or transceivers, the communication technique may consider input from neighboring small cells and multiple measurements. This use of spatial context may also decrease the probability of coverage holes. In addition, the communication technique may consider temporal context, such as the variation of neighbor measurements over time. This temporal filtering may help address issues arising from measurements that do not represent the typical signal strength from a small cell.

Figure 1:
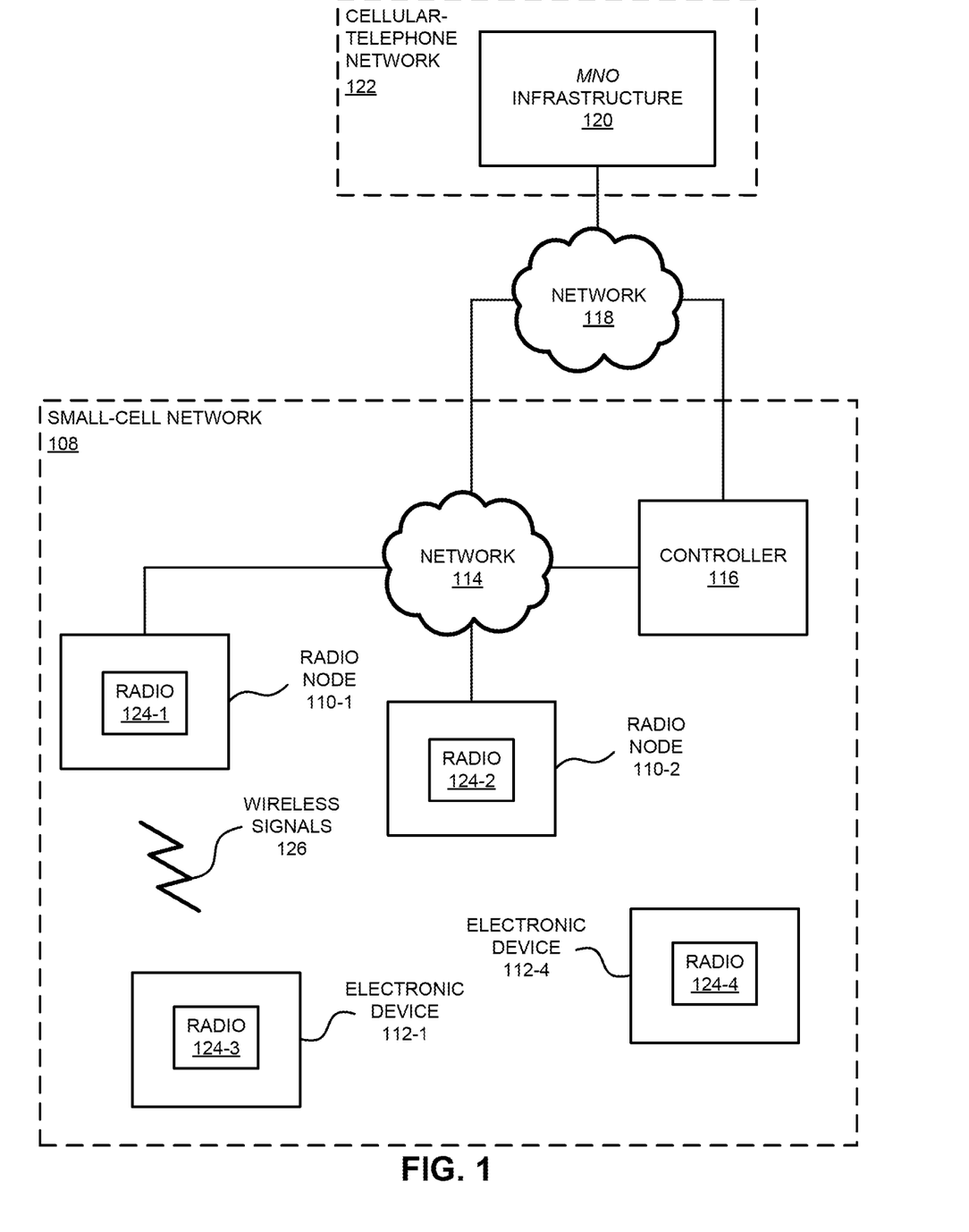
FIG. 1 is a block diagram illustrating an example of a system in accordance with an embodiment of the present disclosure.

FIG. 1 presents a block diagram illustrating radio nodes 110 (such as a transceiver or an electronic device that is associated with a small cell that communicates using Wi-Fi or LTE, e.g., it may be or may provide at least some of the functionality of an eNodeB, in a small-cell network 108) and electronic devices 112 (such as a portable electronic device, e.g., a cellular telephone or a smartphone) that wirelessly communicate with each other in small-cell network 108 in an environment (such as in or at a venue or a building) according to some embodiments. Notably, radio nodes 110 and electronic devices 112 may wirelessly communicate while: transmitting advertising frames on wireless channels, detecting one another by scanning wireless channels, establishing connections (for example, by transmitting association or attach requests), and/or transmitting and receiving packets (which may include the association requests and/or additional information as payloads).

Moreover, radio nodes 110 may communicate, via network 114, with each other and/or with a controller 116 (such as a radio network controller). Furthermore, radio nodes 110 and/or controller 116 may communicate, via network 118, with a mobile-network-operator (MNO) infrastructure 120 of a cellular-telephone network 122 (such as the MNO core of the Evolved Packet Core or EPC). Notably, network 114 may include a local area network, an intranet or the Internet (and, more generally, a wired network), and network 118 may include the Internet (and, more generally, a wired network). Thus, radio nodes 110 may access MNO infrastructure 120 by communicating, either directly or via controller 116, via networks 114 and 118 with MNO infrastructure 120 of cellular-telephone network 122. Note that controller 116 may be a cloud-based computer that configures and operates as an administrator for radio nodes 110. In general, communication between radio nodes 110 and controller 116 may involve a wired communication protocol, such as Ethernet.

Figure 4:
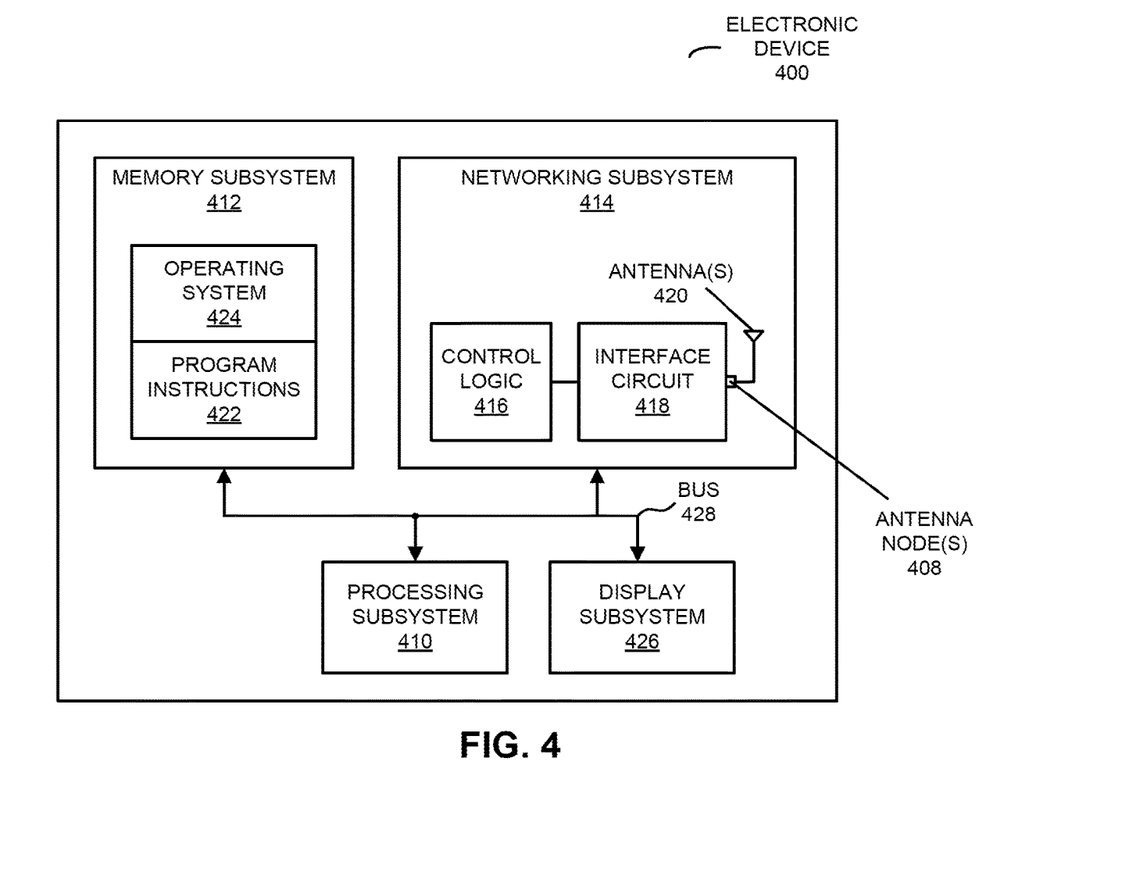
FIG. 4 is a block diagram illustrating an example of an electronic device in accordance with an embodiment of the present disclosure.

As described further below with reference to FIG. 4, radio nodes 110, electronic devices 112, and/or controller 116 may include subsystems, such as a networking subsystem, a memory subsystem and a processor subsystem. In addition, radio nodes 110 and electronic devices 112 may include radios 124 in the networking subsystems. More generally, radio nodes 110 and electronic devices 112 can include (or can be included within) any electronic devices with the networking subsystems that enable radio nodes 110 and electronic devices 112 to wirelessly communicate with each other. This wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 124 are shown in radio nodes 110 and electronic devices 112, one or more of these instances may be different from the other instances of radios 124.

As can be seen in FIG. 1, wireless signals 126 (represented by a jagged line) are transmitted from radio 124-3 in electronic device 112-1. These wireless signals may be received by radio 124-1 in radio node 110-1. Notably, electronic device 112-1 may transmit packets. In turn, these packets may be received by radio node 110-1. Moreover, radio node 110-1 may allow electronic device 112-1 to communicate with other electronic devices, computers and/or servers (either locally or remotely) via network 114, network 118, and/or cellular-telephone network 122.

Note that the communication between radio nodes 110 and electronic devices 112 may be characterized by a variety of performance metrics, such as: an RSSI, a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Figure 2:
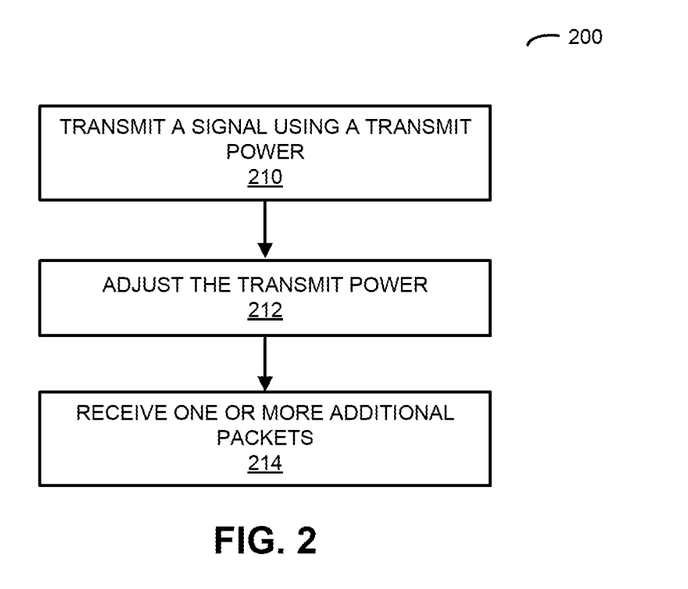
FIG. 2 is a flow diagram illustrating an example method for adjusting a transmit power in the system in FIG. 1 in accordance with an embodiment of the present disclosure.

As discussed further below with reference to FIGS. 2 and 3, in the communication technique a given one of radio nodes 110 (such as radio node 110-1) may transmit, using radio 124-1, a signal using a transmit power. Then, radio node 110-1 may adjust the transmit power within a range of values, e.g., between the minimum transmit power and the maximum transmit power. The adjustment may include reducing the transmit power when a spatial RSSI metric of radio node 110-1 is greater than a first threshold value and a coverage criterion is met.

Note that the spatial RSSI metric of radio node 110-1 may correspond to a set of temporal RSSI metrics of radio node 110-1 received from neighboring radio nodes 110, where the set of temporal RSSI metrics may correspond to RSSI measurements of radio node 110-1 as a function of time at neighboring radio nodes 110. For example, neighboring radio nodes 110 may perform measurements of the RSSI of radio node 110-1 (i.e., neighboring radio nodes 110 may measure the signal strength of the signal from radio node 110-1 at neighboring radio nodes 110), and a given neighboring radio node may compute a temporal RSSI metric of radio node 110-1 (such as the median, a weighted mean or a filtered value) using the measurements of the RSSI of radio node 110-1 as a function of time that were performed by the given neighboring radio node. (Consequently, the given radio node may compute a separate temporal RSSI metric for each of its neighboring radio nodes 110.) These temporal RSSI metrics of radio node 110-1 (i.e., the set of temporal RSSI metrics) may be provided by neighboring radio nodes 110 to radio node 110-1 (such as via one or more X2 interface connections or another type of interface). Thus, the set of temporal RSSI metrics may incorporate the temporal context.

Moreover, radio node 110-1 may use the set of temporal RSSI metrics of radio node 110-1 to compute the spatial RSSI metric (such as a weighted mean). This spatial RSSI metric may represent the environment of radio node 110-1, i.e., it may incorporate the spatial context. Note that if the spatial RSSI metric is greater than the first threshold value, then there is too much signal or interference at neighboring radio nodes 110 and radio node 110-1 can reduce the transmit power.

Furthermore, the coverage criterion may be that less than a portion of RSSI measurements of radio node 110-1 associated with electronic devices 112, which are communicatively attached with radio node 110-1, is less than a second threshold value. For example, a given electronic device may measure the signal strength of the signal from radio node 110-1 at the given electronic device as a function of time, and may report these measurements to radio node 110-1 (such as via wireless communication). If a sufficient number of these RSSI measurements are large enough (such as larger than the second threshold value), then radio node 110-1 can reduce the transmit power without adversely impacting the coverage.

Alternatively, the adjustment may include increasing the transmit power when the spatial RSSI metric is less than the first threshold value. This may ensure that there is sufficient signal power from radio node 110-1 at neighboring radio nodes 110.

Note that initially the transmit power of radio node 110-1 may be the maximum transmit power.

In some embodiments, the RSSIs measured by each of radio nodes 110 may include reference signal receive powers (RSRPs), where the RSRP is a measurement of the received power level in, e.g., an LTE network (such as small-cell network 108). For example, each small cell in an LTE radio network may transmit a cell-specific reference signal. The RSRP may be a type of RSSI measurement. Notably, it may be the power of the LTE reference signals spread over the full bandwidth and narrowband.

In the preceding discussion, the communication technique is illustrated using a distributed SON architecture (e.g., each of radio nodes 110 may perform the communication technique). However, in other embodiments, the communication technique may, at least in part, use a centralized SON architecture. For example, controller 116 may perform at least some of the operations in the communication technique. Notably, radio nodes 110 may perform the RSSI measurements and then may provide these RSSI measurements to controller 116 via network 114. Next, controller 116 may compute the temporal RSSI metrics and may calculate the spatial RSSI metrics, and may provide the spatial RSSI metrics to radio nodes 110 via network 114.

Thus, the communication technique may allow radio nodes 110 to dynamically adjust their transmit powers in a coordinated, yet independent manner (i.e., on a small cell-by-small cell basis) using local information in small-cell network 108. Notably, the communication technique may provide situational awareness to radio nodes 110 to allow radio nodes 110 to adjust their transmit powers to reduce interference (as indicated by the spatial RSSI metrics from neighboring radio nodes 110), while maintaining coverage (as indicated by the RSSI measurements provided by electronic devices 112). Consequently, the communication technique may improve communication performance and, thus, customer satisfaction when using small-cell network 108.

In the described embodiments processing a packet or frame in radio nodes 110 and/or electronic devices 112 includes: receiving wireless signals 126 with the packet or frame; decoding/extracting the packet or frame from received wireless signals 126 to acquire the packet or frame; and processing the packet or frame to determine information contained in the packet or frame (such as information for small-cell network 108).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

We now describe embodiments of the method. FIG. 2 presents a flow diagram illustrating an example of a method 200 for adjusting a transmit power, which may be performed by a radio node, such as radio node 110-1 in FIG. 1. During operation, the radio node may transmit a signal using the transmit power (operation 210). Then, the radio node may adjust the transmit power (operation 212) within a range of values. The adjustment (operation 212) may include reducing the transmit power when a spatial RSSI metric of the radio node is greater than a first threshold value and a coverage criterion is met. Note that the spatial RSSI metric of the radio node may correspond to a set of temporal RSSI metrics of the radio node received from the neighboring radio nodes, where the set of temporal RSSI metrics may correspond to RSSI measurements of the radio node at the neighboring radio nodes. Moreover, the coverage criterion may be that less than a portion of RSSI measurements of the radio node associated with electronic devices, which are communicatively attached with the radio node, is less than a second threshold value. Alternatively, the adjustment (operation 212) may include increasing the transmit power when the spatial RSSI metric is less than the first threshold value.

In some embodiments, the radio node optionally performs one or more additional operations (operation 214). For example, the radio node may: measure RSSIs of the neighboring radio nodes; compute temporal RSSI metrics based at least in part on the RSSI measurements of the neighboring radio nodes; exchange information specifying the set of temporal RSSI metrics with the neighboring radio nodes, where the set of temporal RSSI metrics include the computed temporal RSSI metrics; calculate the spatial RSSI metric representing the environment of the radio node based at least in part on the set of temporal RSSI metrics of the radio node received from the neighboring radio nodes, where a given temporal RSSI metric of the radio node in the set of temporal RSSI metrics used to compute the spatial RSSI metric is associated with a given neighboring radio node; and receive the RSSI measurements of the radio node associated with the electronic devices that are communicatively attached with the radio node.

Note that the radio node may measure the RSSIs using a network listen mode.

Moreover, computing the temporal RSSI metrics may involve at least one of: a median, an infinite impulse response filter, or a weighted mean. Furthermore, calculating the spatial RSSI metric may involve a weighted mean.

Additionally, the measuring of the RSSI of the neighboring radio nodes may be performed at same frequency as the RSSI measurements of the radio node associated with the electronic devices that are communicatively attached to the radio node.

In some embodiments, the neighboring radio nodes include at least intra-frequency neighboring radio nodes that operate at the same frequency as the radio node. Alternatively, the neighboring radio nodes may include intra-frequency neighboring radio nodes that operate at the same frequency as the radio node and inter-frequency neighboring radio nodes that operate at different frequencies as the radio node.

Moreover, the RSSIs may include RSRPs.

Furthermore, the radio node and the neighboring radio nodes may include eNodeBs, a UMTS NodeB and/or an NR gNodeB.

Additionally, the radio node may exchange the information specifying the set of temporal RSSI metrics using one or more X2 interface connections.

Note that the transmit power may initially be a maximum transmit power.

In some embodiments of method 200, there may be additional or fewer operations. Moreover, there may be one or more different operations. Furthermore, the order of the operations may be changed, and/or two or more operations may be combined into a single operation.

Figure 3:
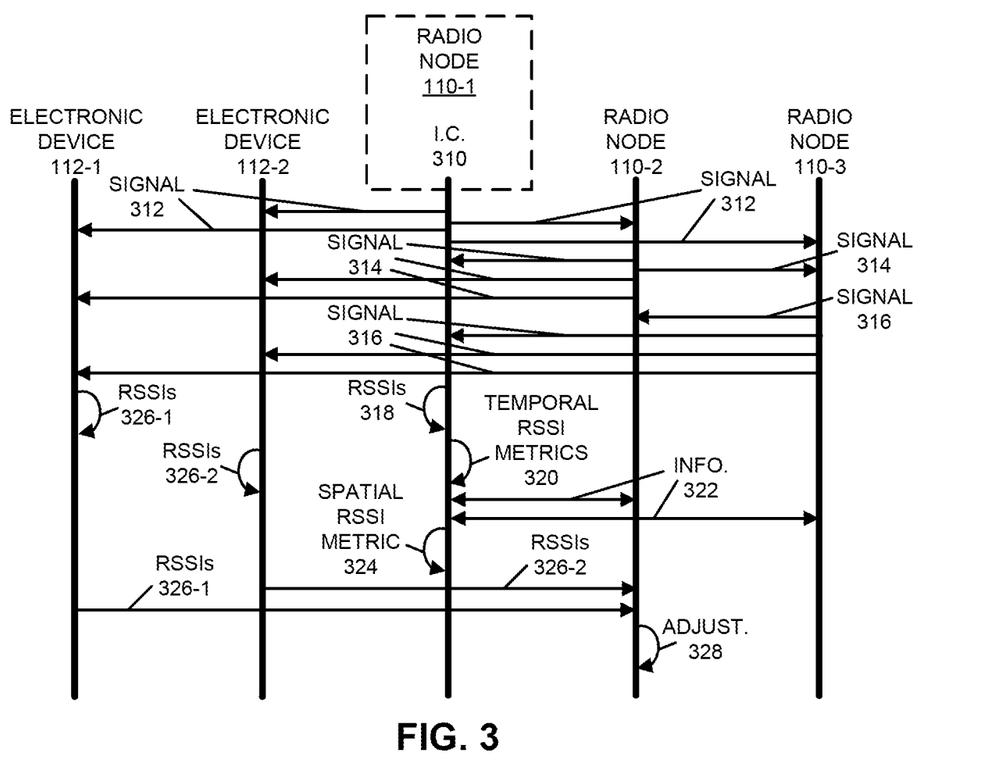
FIG. 3 is a drawing illustrating an example of communication among electronic devices in FIG. 1 in accordance with an embodiment of the present disclosure.

Embodiments of the communication technique are further illustrated in FIG. 3, which presents a drawing illustrating communication among radio node 110-1, radio node 110-2, radio node 110-3, electronic device 112-1 and electronic device 112-2. Note that electronic devices 112-1 and 112-2 may be communicatively attached to radio node 110-1. For example, electronic devices 112-1 and 112-2 may associated with radio node 110-1.

During the communication technique, interface circuit (I.C.) 310 in radio node 110-1 may transmit a signal 312 using a transmit power (which initially may be a maximum transmit power). Similarly, radio nodes 110-2 and 110-3 may transmit signals 314 and 316, respectively.

Moreover, interface circuit 310 may measure RSSIs 318 of signals 314 and 316 of neighboring radio nodes (e.g., radio nodes 110-2 and 110-3). Then, interface circuit 310 may compute separate temporal RSSI metrics 320 based at least in part on RSSI measurements 318 of radio nodes 110-2 and 110-3. Next, interface circuit 310 may exchange information 322 specifying a set of temporal RSSI metrics (which includes the computed temporal RSSI metrics 320) with radio nodes 110-2 and 110-3. For example, interface circuit 310 may provide the computed temporal RSSI metric of radio node 110-2 to radio node 110-2 and the computed temporal RSSI metric of radio node 110-3 to radio node 110-3. While not shown in FIG. 3, the measuring, computing and exchanging operations may also be performed by radio nodes 110-2 and 110-3. Thus, radio nodes 110-2 and 110-3 may perform measurements of signal 312. Therefore, radio nodes 110-2 and 110-3 may, respectively, provide computed temporal RSSI metrics of radio node 110-1 to radio node 110-1. The computed temporal RSSI metrics of radio node 110-1 from radio nodes 110-2 and 110-3 may be included in information 322 and, thus, the set of temporal RSSI metrics that is subsequently used by radio node 110-1 in the communication technique.

Furthermore, after receiving information 322, interface circuit 310 may calculate a spatial RSSI metric 324 representing the environment of radio node 110-1 based at least in part on the set of temporal RSSI metrics of radio node 110-1 received from radio nodes 110-2 and 110-3, where a given temporal RSSI metric of radio node 110-1 in the set of temporal RSSI metrics used to compute the spatial RSSI metric 324 is associated with a given one of radio nodes 110-2 or 110-3.

Additionally, electronic devices 112-1 and 112-2 may perform RSSI 326 measurements 326 of signal 312, and may provide RSSI 326 measurements of radio node 110-1 to radio node 110-1.

Based at least in part on spatial RSSI metric 324 and a coverage criterion corresponding to RSSI 326 measurements, interface circuit 310 may adjust 328 the transmit power within a range of values, such as between the minimum transmit power and the maximum transmit power. Radio nodes 110-2 and 110-3 may perform similar dynamic adjustments of their transmit powers.

Notably, adjustment 328 may include reducing the transmit power when spatial RSSI metric 324 of radio node 110-1 is greater than a first threshold value and the coverage criterion is met. Note that spatial RSSI metric 324 of radio node 110-1 may correspond to the set of temporal RSSI metrics of radio node 110-1 received from radio nodes 110-2 and 110-3, where the set of temporal RSSI metrics may correspond to RSSI measurements of radio node 110-1 at radio nodes 110-2 and 1103. Moreover, the coverage criterion may be that less than a portion of RSSI measurements 326 of radio node 110-1 associated with electronic devices 112-1 and 112-2 is less than a second threshold value. Alternatively, adjustment 328 may include increasing the transmit power when spatial RSSI metric 324 is less than the first threshold value.

While FIG. 3 illustrates particular operations involving unilateral or bilateral communication, in general each of the operations illustrated in FIG. 3 may involve unilateral or bilateral communication.

In some embodiments, the communication technique facilitates dynamic transmit power adjustment. During the communication technique, a network listen module within a SON module may provide measurements of neighboring small cells as an input in the dynamic transmit power adjustment. The network listen module may measure and report the RSRP of small cells it can listen to. Note that the network listen module may detect neighbors at boot-up and/or periodically (such as after 1 min, 5 min, 10 min, 30 min, 1 hr., 3 hrs., 6 hrs., 12 hrs., 1 day, etc.). Moreover, note that the network listen reports may be intra and/or inter frequency neighbors. However, in some embodiments, the communication technique may use the intra-frequency measurements. Furthermore, in some embodiments, the small cells may perform the network listening with the same periodicity. Additionally, the small cells may establish an X2 connection, so that they can exchange information such as transmit power between the small cells.

Note that a small cell may be denoted by $SC_i$, where i is the index of the small cell. The set of neighbor small cells of $SC_i$ may be denoted by $N_i$, which may have a cardinality of $n_i$. Moreover, the RSRP measurement of $SC_i$ at $SC_j$ at time t may be denoted by $RSRP_{i \to j}(t)$. Furthermore, this information may be exchanged over an X2 interface and $SC_i$ may know $RSRP_{i \to j}(t)$. In general, the network listening by the small cells may not be synchronized. Consequently, a small cell performing a network listen should be able to recognize its neighbors with very high probability.

During the communication technique, each small cell may execute the following operations independently. Note that the communication technique may have a minimum coverage criterion specified by an RSRP measurement by an electronic device of $T_{RSRP}$, such as −90 to −110 dBm, e.g., −100 dBm. The communication technique may attempt to ensure that the measured RSRP at neighboring small cells is at most γ (such as −100 dBm), as long as the aforementioned coverage criterion is satisfied or met. Moreover, when brought up, a small cell may start transmitting at the maximum allowed (or configured) transmit power level $P_{max}$ (e.g., a reference-signal power of −7 dBm). Furthermore, the small cells may be configured to have a minimum allowed transmit power level $P_{min}$.

Initially, a given small cell may start transmitting at the maximum transmit power may gradually reduce their transmit power to reduce their interference footprint, while continuously monitoring the RSRP reports of attached electronic devices or user equipment (UEs). If more than β (e.g., β equal to between 5 and 20%, such as 5%) of the electronic devices report serving small-cell measurements that are less than $T_{RSRP}$, the transmit power may not be decreased further.

The following operations are indexed for $SC_i$. Note that operations 1 through 4 may be executed periodically with the same frequency that the network listening is performed.

Operation 1: For each $SC_j \in N_i$, a single temporal RSRP metric $R_j(t)$ may be computed based on all or a subset of the RSRP measurements:

$$R_j(t) = f(RSRP_{i \to j}(t), RSRP_{i \to j}(t-1), \ldots, RSRP_{i \to j}(t-K+1)),$$

where K equals 1, 2, . . . , and f denotes a function. Some examples of this function may include: an infinite impulse response filter ($R_j(t) = a \cdot RSRP_{i \to j}(t) + b \cdot RSRP_{i \to j}(t-1)$, where a+b equals 1), a median ($R_j(t) = median(RSRP_{i \to j}(t), RSRP_{i \to j}(t-1), \ldots, RSRP_{i \to j}(t-K+1))$), or a weighed mean:

$$R_j(t) = \sum_{l=1}^{K} w_l RSRP_{i \to j}(t-l+1),$$

where $$\sum_{l=1}^{K} w_l = 1.$$

Operation 2: The computed metrics $R_j(t)$ for the $SC_j \in N_i$ may be sorted from highest to lowest. Without loss of generality, assume that $R_1(t) \geq R_2(t) \geq \ldots \geq R_{ni}(t)$. If a particular small cell $SC_j$ is not detected for C consecutive times, $R_j(t)$ may not considered for subsequent transmit-power changes.

Operation 3: Next, a spatial RSRP metric representing the environment of $SC_i$ may be computed. This spatial RSRP metric may be a function g of the temporal RSRP metrics of the neighbors of $SC_i$: $g(R_1(t), R_2(t), \ldots, R_{n_i}(t))$. For example, the function g may be a weighted mean:

$$g(R_1(t), R_2(t), \ldots, R_{n_i}(t)) = \sum_{m=1}^{n_i} z_m R_m(t),$$

where $$\sum_{m=1}^{n_i} z_m = 1.$$

Note that the function g may represent or may include a large class of possible functions that can be used in the communication technique. Moreover, the weights may be adjusted to favor small cells with strong signals and to omit small cells with weaker signals. For example, when $z_1$ equals 1, the spatial RSRP metric calculation may only consider the small cell with the strongest signal while omitting the other small cells.

Operation 4: If the following three conditions I, II and III are satisfied, the transmit power may be reduced by $\alpha$ (e.g., $\alpha$ may be 2 dB):
  I. The spatial RSRP metric may be greater than a predefined threshold value $\gamma$ (e.g., $\gamma$ may be $-100$ dBm),
  II. The current value of the transmit power is greater than or equal to $P_{min}$ plus $\alpha$.
  III. III. Less than $\beta$ percent of the electronic devices report serving small-cell measurements less than $T_{RSRP}$.

Alternatively, if the following two conditions are satisfied, the transmit power may be increased by $\alpha$:
  I. The spatial RSRP metric may be less than the predefined threshold value $\gamma$.
  II. The current value of the transmit power may be less than or equal to $P_{max}$ plus $\alpha$.

Note that the reduction or increase of transmit power in increments of $\alpha$ may help ensure that drastic changes in the overall coverage do not occur. Each of the small cells may eventually converge to their transmit-power setting (such as an optimal transmit power).

In summary, in the communication technique, dynamic transmit power adjustment may use network listen and the exchange of information over an X2 interface. The communication technique may attempt to ensure that the signal strength at neighboring small cells is approximately at a certain threshold, while ensuring that the transmit power remains between predefined or preconfigured values of $P_{min}$ and $P_{max}$. Moreover, the communication technique may also be constrained by a coverage criterion that ensure that the majority of users in the small cell are in good geometry. Furthermore, the communication technique may consider both temporal and deployment related variations in the measured signal strengths to reduce or eliminate the effect of noise in real measurements and to prevent coverage holes.

We now describe embodiments of an electronic device, which may perform at least some of the operations in the communication technique. For example, the electronic device may include one of radio nodes 110 (such as a radio node in small-cell network 108 or a transceiver in a wireless local area network), one of electronic devices 112 or controller 116 in FIG. 1. FIG. 4 presents a block diagram illustrating an electronic device 400 in accordance with some embodiments. This electronic device includes processing subsystem 410, memory subsystem 412, and networking subsystem 414. Processing subsystem 410 includes one or more devices configured to perform computational operations. For example, processing subsystem 410 can include one or more microprocessors, ASICs, microcontrollers, programmable-logic devices, graphics processing units (GPUs) and/or one or more digital signal processors (DSPs).

Memory subsystem 412 includes one or more devices for storing data and/or instructions for processing subsystem 410 and networking subsystem 414. For example, memory subsystem 412 can include dynamic random access memory (DRAM), static random access memory (SRAM), and/or other types of memory. In some embodiments, instructions for processing subsystem 410 in memory subsystem 412 include: one or more program modules or sets of instructions (such as program instructions 422 or operating system 424), which may be executed by processing subsystem 410. Note that the one or more computer programs may constitute a computer-program mechanism. Moreover, instructions in the various modules in memory subsystem 412 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 410.

In addition, memory subsystem 412 can include mechanisms for controlling access to the memory. In some embodiments, memory subsystem 412 includes a memory hierarchy that comprises one or more caches coupled to a memory in electronic device 400. In some of these embodiments, one or more of the caches is located in processing subsystem 410.

In some embodiments, memory subsystem 412 is coupled to one or more high-capacity mass-storage devices (not shown). For example, memory subsystem 412 can be coupled to a magnetic or optical drive, a solid-state drive, or another type of mass-storage device. In these embodiments, memory subsystem 412 can be used by electronic device 400 as fast-access storage for often-used data, while the mass-storage device is used to store less frequently used data.

Networking subsystem 414 includes one or more devices configured to couple to and communicate on a wired and/or wireless network (i.e., to perform network operations), including: control logic 416, an interface circuit 418 and one or more antennas 420 (or antenna elements). (While FIG. 4 includes one or more antennas 420, in some embodiments electronic device 400 includes one or more nodes, such as nodes 408, e.g., a pad, which can be coupled to the one or more antennas 420. Thus, electronic device 400 may or may not include the one or more antennas 420. Note that nodes 408 may include one or more input nodes and/or one or more output nodes.) For example, networking subsystem 414 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 414 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 400 may use the mechanisms in networking subsystem 414 for performing simple wireless communication between the electronic devices, e.g., transmitting advertising or beacon frames and/or scanning for advertising frames transmitted by other electronic devices as described previously.

Within electronic device 400, processing subsystem 410, memory subsystem 412, and networking subsystem 414 are coupled together using bus 428. Bus 428 may include an electrical, optical, and/or electro-optical connection that the subsystems can use to communicate commands and data among one another. Although only one bus 428 is shown for clarity, different embodiments can include a different number or configuration of electrical, optical, and/or electro-optical connections among the subsystems.

In some embodiments, electronic device 400 includes a display subsystem 426 for displaying information on a display, which may include a display driver and the display, such as a liquid-crystal display, a multi-touch touchscreen, etc.

Electronic device 400 can be (or can be included in) any electronic device with at least one network interface. For example, electronic device 400 can be (or can be included in): a desktop computer, a laptop computer, a subnotebook/netbook, a server, a tablet computer, a smartphone, a cellular telephone, a smartwatch, a consumer-electronic device, a portable computing device, a wearable device, an access point, a transceiver, an eNodeB, a router, a switch, communication equipment, a controller, test equipment, and/or another electronic device.

Although specific components are used to describe electronic device 400, in alternative embodiments, different components and/or subsystems may be present in electronic device 400. For example, electronic device 400 may include one or more additional processing subsystems, memory subsystems, networking subsystems, and/or display subsystems. Additionally, one or more of the subsystems may not be present in electronic device 400. Moreover, in some embodiments, electronic device 400 may include one or more additional subsystems that are not shown in FIG. 4. Also, although separate subsystems are shown in FIG. 4, in some embodiments some or all of a given subsystem or component can be integrated into one or more of the other subsystems or component(s) in electronic device 400. For example, in some embodiments program instructions 422 are included in operating system 424 and/or control logic 416 is included in interface circuit 418.

Moreover, the circuits and components in electronic device 400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 414. The integrated circuit may include hardware and/or software mechanisms that are used for transmitting wireless signals from electronic device 400 and receiving signals at electronic device 400 from other electronic devices. Aside from the mechanisms herein described, radios are generally known in the art and hence are not described in detail. In general, networking subsystem 414 and/or the integrated circuit can include any number of radios. Note that the radios in multiple-radio embodiments function in a similar way to the described single-radio embodiments.

In some embodiments, networking subsystem 414 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an LTE communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program instructions 422, operating system 424 (such as a driver for interface circuit 418) or in firmware in interface circuit 418. Alternatively or additionally, at least some of the operations in the communication technique may be implemented in a physical layer, such as hardware in interface circuit 418.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication techniques, different numerical values may be used.

While the preceding discussion illustrated the communication techniques using communication in particular bands of frequencies, other bands of frequencies may be used, such as bands of frequencies corresponding to LTE and/or CBRS.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer, comprising:
an interface circuit configured to communicate with a radio node and one or more neighboring radio nodes of the radio node, wherein the computer is configured to perform operations comprising:
receiving, at the interface circuit, information specifying received signal strength indication, RSSI, measurements associated with the radio node and the one or more neighboring radio nodes, wherein the RSSI measurements are performed by the one or more neighboring radio nodes, by one or more electronic devices communicatively attached with the radio node, or both, and wherein the RSSI measurements correspond to a signal transmitted by the radio node using a transmit power;
calculating, based at least in part on a set of temporal RSSI metrics of the radio node corresponding to the RSSI measurements, a spatial RSSI metric of the radio node; and
providing, from the interface circuit, transmit-power information addressed to the radio node, wherein the transmit-power information corresponds to the spatial RSSI metric and, in conjunction with a first threshold value and a second threshold value, specifies an adjustment of the transmit power within a range of values,
wherein the adjustment comprises reducing the transmit power when the spatial RSSI metric is greater than the first threshold value and a coverage criterion corresponding to the second threshold value is met, and
wherein the adjustment comprises increasing the transmit power when the spatial RSSI metric is less than the first threshold value.

2. The computer of claim 1, wherein the transmit-power information comprises one or more of: the spatial RSSI metric; or the adjustment.

3. The computer of claim 1, wherein the RSSI measurements comprise reference signal receive powers, RSRPs.

4. The computer of claim 1, wherein the computer comprises a controller of the radio node and the one or more neighboring radio nodes.

5. The computer of claim 1, wherein computing the temporal RSSI metrics comprises at least one of: a median, an infinite impulse response filter, or a weighted mean.

6. The computer of claim 1, wherein calculating the spatial RSSI metric comprises a weighted mean.

7. The computer of claim 1, wherein the RSSI measurements performed by the one or more neighboring radio nodes are at same frequency as the RSSI measurements performed by the one or more electronic devices.

8. The computer of claim 1, wherein the radio node operates at the same frequency as that of at least one or more intra-frequency neighboring radio nodes comprised in the one or more neighboring radio nodes.

9. The computer of claim 1, wherein the radio node and the one or more neighboring radio nodes comprise eNodeBs.

10. The computer of claim 1, wherein the interface circuit is configured to receive the RSSI measurements and to provide the transmit-power information using one or more X2 interface connections.

11. The computer of claim 1, wherein the coverage criterion is that less than a portion of the RSSI measurements of the signal performed by the one or more electronic devices is less than the second threshold value.

12. A non-transitory computer-readable storage medium for use in conjunction with a computer, the computer-readable storage medium storing program instructions, wherein, when executed by the computer, the program instructions cause the computer to perform operations comprising:
receiving, at an interface circuit in the computer, information specifying received signal strength indication, RSSI, measurements associated with a radio node, one or more neighboring radio nodes of the radio node, or both, wherein the RSSI measurements are performed by the one or more neighboring radio nodes and by one or more electronic devices communicatively attached with the radio node, and wherein the RSSI measurements correspond to a signal transmitted by the radio node using a transmit power;
calculating, based at least in part on a set of temporal RSSI metrics of the radio node corresponding to the RSSI measurements, a spatial RSSI metric of the radio node; and
providing, from the interface circuit, transmit-power information addressed to the radio node, wherein the transmit-power information corresponds to the spatial RSSI metric and, in conjunction with a first threshold value and a second threshold value, specifies an adjustment of the transmit power within a range of values,
wherein the adjustment comprises reducing the transmit power when the spatial RSSI metric is greater than the first threshold value and a coverage criterion corresponding to the second threshold value is met, and
wherein the adjustment comprises increasing the transmit power when the spatial RSSI metric is less than the first threshold value.

13. The non-transitory computer-readable storage medium of claim 12, wherein the transmit-power information comprises one or more of: the spatial RSSI metric; or the adjustment.

14. The non-transitory computer-readable storage medium of claim 12, wherein the computer comprises a controller of the radio node and the one or more neighboring radio nodes.

15. The non-transitory computer-readable storage medium of claim 12, wherein the RSSI measurements performed by the one or more neighboring radio nodes are at same frequency as the RSSI measurements performed by the one or more electronic devices.

16. The non-transitory computer-readable storage medium of claim 12, wherein the coverage criterion is that less than a portion of the RSSI measurements of the signal performed by the one or more electronic devices is less than the second threshold value.

17. A method for adjusting a transmit power, comprising: by a computer:
receiving, at an interface circuit in the computer, information specifying received signal strength indication, RSSI, measurements associated with a radio node, one or more neighboring radio nodes of the radio node, or both, wherein the RSSI measurements are performed by the one or more neighboring radio nodes and by one or more electronic devices communicatively attached with the radio node, and wherein the RSSI measurements correspond to a signal transmitted by the radio node using a transmit power;
calculating, based at least in part on a set of temporal RSSI metrics of the radio node corresponding to the RSSI measurements, a spatial RSSI metric of the radio node; and
providing, from the interface circuit, transmit-power information addressed to the radio node, wherein the transmit-power information corresponds to the spatial RSSI metric and, in conjunction with a first threshold value and a second threshold value, specifies an adjustment of the transmit power within a range of values,
wherein the adjustment comprises reducing the transmit power when the spatial RSSI metric is greater than the first threshold value and a coverage criterion corresponding to the second threshold value is met, and
wherein the adjustment comprises increasing the transmit power when the spatial RSSI metric is less than the first threshold value.

18. The method of claim 17, wherein the transmit-power information comprises one or more of: the spatial RSSI metric; or the adjustment.

19. The method of claim 17, wherein the computer comprises a controller of the radio node and the one or more neighboring radio nodes.

20. The method of claim 17, wherein the coverage criterion is that less than a portion of the RSSI measurements of the signal performed by the one or more electronic devices is less than the second threshold value.

* * * * *